UNITED STATES PATENT OFFICE.

ROBERT E. SCHMIDT, OF ELBERFELD, GERMANY, ASSIGNOR TO THE FARBENFABRIKEN, VORMALS FR. BAYER & CO., OF SAME PLACE.

HEXAOXYANTHRAQUINONE AND PROCESS OF MAKING IT.

SPECIFICATION forming part of Letters Patent No. 503,295, dated August 15, 1893.

Application filed November 18, 1891. Serial No. 412,304. (Specimens.)

*To all whom it may concern:*

Be it known that I, ROBERT E. SCHMIDT, doctor of philosophy, chemist, (assignor to the FARBENFABRIKEN, VORMALS FR. BAYER & CO., of Elberfeld,) a subject of the Emperor of Germany, residing at Elberfeld, Germany, have invented new and useful Improvements in the Production of a New Anthraquinone Derivative, of which I give in the following a clear and exact description.

My invention relates to the production of a new hexaoyanthraquinone of the formula— $C_{14}H_2O_2(OH)_6$ and which I have obtained in the following ways: first, by acting with fuming sulfuric acid of a high percentage of anhydrid at common temperature upon alizarin quinizarin, alizarin bordeaux (described in my Letters Patent No. 446,893, dated February 24, 1891), purpurin, purpuroxanthin or purpurin bordeaux, (which latter product results when purpurin or purpuroxanthin is treated with fuming sulfuric acid according to that process described in the last named Letters Patent;) secondly, by heating alizarin bordeaux or purpurin bordeaux with concentrated sulfuric acid at a temperature of from about 180° to 230° centigrade; thirdly, by the action of pure sulfuric anhydrid upon anthraquinone; fourthly, by reacting with sulfuric anhydrid upon anthrachryson or symmetric dihydroxy benzoic acid.

In carrying out my process practically, that is in order to produce the hexaoxyanthraquinone firstly by the action of strong fuming sulfuric acid at common temperature upon the following products: alizarin, quinizarin, alizarin bordeaux, purpurin, purpuroxanthin or purpurin bordeaux, I proceed in general in the like manner and I give in the following an example for the conversion of alizarin into hexaoxyanthraquinone: Ten kilos of dried alizarin are introduced into two hundred kilos of fuming sulfuric acid containing about eighty per cent. of sulfuric acid anhydrid. The mixture is then allowed to stand for several days at a temperature not rising above 50° centigrade. From time to time a portion of the mixture is poured into water. The resulting liquid is heated to boiling and filtered. After the precipitate, thereupon, has been redissolved in the necessary quantity of sodium-lye this fluid is heated to boiling and directly decomposed by the addition of acids. The precipitate thus obtained is now filtered off, washed, dried and dissolved in concentrated sulfuric acid. The oxidation caused by the employment of the fuming sulfuric acid is completed, when two subsequent samples of the sulfurizing mixture treated in the aforesaid manner yield precipitates the solutions of which in concentrated sulfuric acid show no difference, especially no increase in fluorescence.

The coloring matter, that is to say, the hexaoxyanthraquinone, is not produced immediately in this process but at first a sulfuric acid ether thereof is formed which, however, is converted into the dyestuff by the following treatment of the obtained mixture: The latter is, most practically, poured at first into concentrated sulfuric acid and the resulting liquid then added to ice. The mixture is allowed to melt and is then heated to boiling. After the fluid has been heated to boiling, the separating precipitate is filtered off, washed out and changed into the dye-stuff by heating with acids. In order to convert the intermediate product into the coloring matter also the alkaline solutions of the former after having been heated to boiling, may be decomposed by the addition of acids. Owing to its insolubility in water and acids the new anthraquinone derivative separates and it may easily be isolated by filtration. When in the aforesaid example the alizarin is replaced by the corresponding quantity of quinizarin, alizarin bordeaux which I have described in my Letters Patent No. 446,893, dated February 24, 1891, of purpurin, purpuroxanthin or purpurin bordeaux which latter I have obtained from purpurin or purpuroxanthin by treating them with fuming sulfuric acid likewise hexaoxyanthraquinone results.

Secondly, the process for producing hexaoxyanthraquinone by the action of concentrated sulfuric acid upon alizarin bordeaux: or purpurin bordeaux may be carried out in the manner described in the following example for the employment of alizarin bordeaux. A mixture of ten kilos of the latter dried product and two hundred kilos of concentrated sulfuric acid at 66° Baumé is heated at 200° centigrade for from about six to eight hours. The thus resulting mixture, is then poured into two thousand kilos of water and after this liquid has been heated to boiling, the precipitate is filtered off, redissolved in alkalies and separated again by adding acids to the alkaline solution. When purpurin bordeaux is subjected to this process the same product, that is to say, hexaoxyanthraquinone, is obtained.

As to the third process for the production of hexaoxyanthraquinone which consists in treating anthraquinone with pure fuming sulfuric anhydrid the following may be given as an example: A mixture of ten kilos of anthraquinone with one hundred kilos of sulfuric acid anhydrid is allowed to stand in a closed vessel and on stirring from time to time at a temperature not rising above 50° centigrade. The thus obtained liquid then is mixed with about two hundred kilos of sulfuric acid monohydrate, sulfur dioxide being disengaged in the same time, and the whole mixture is poured into ice. The fluid is heated to boiling and the precipitate is filtered off. The latter, then is redissolved in alkali and, after this alkaline solution has been filtered off in order to remove the anthraquinone not altered in the reaction, the boiling filtered solution is decomposed by the addition of muriatic or sulfuric acid. The separating precipitate filtered off and dried, likewise, represents hexaoxyanthraquinone, which is identical with that obtained according to the aforesaid processes.

Fourthly the antrachryson, which is obtained according to the notes of Barth and Sennhofer (see *Liebig's Annals*, vol. 164, pp. 109–115) by heating symmetrical dihydroxybenzoic acid without or with sulfuric acid or likewise the said dihydroxybenzoic acid may be employed for producing hexaoxyanthraquinone.

The following may be given as an example for the conversion of anthrachryson into the new anthraquinone derivative by treating it with strong fuming sulfuric acid: Ten kilos of anthrachryson are introduced at a low temperature into two hundred kilos of fuming sulfuric acid containing about eighty per cent. of anhydrid. After the mixture has been allowed to stand for four or five days it is poured into about fifteen hundred kilos of icy cold water. The precipitate separating which represents the intermediate product, that is to say, the neutral sulfuric acid ether of the coloring matter (hexaoxyanthraquinone) is filtered off and redissolved in a small excess of soda-lye. This alkaline solution, then, is heated to boiling and decomposed by the addition of an acid in excess. After heating the acid liquid for about half an hour the precipitate resulting is filtered off, washed and dried.

When in the foregoing example the symmetrical dihydroxybenzoic acid is employed for the production of hexaoxyanthraquinone, at first by the sulfuric acid anthrachryson is formed and, then, this product is oxidized into hexaoxyanthraquinone by the action of the fuming sulfuric acid anhydrid.

In the aforesaid processes the fuming sulfuric acid acts as an oxidizing agent in the same manner as described in the specification of my Letters Patent No. 446,893, dated February 24, 1891; in the first stage an intermediate product is formed which represents the sulfuric acid ether of the new dye-stuff (hexaoxyanthraquinone) and which is easily to be changed into the hexaoxyanthraquinone by boiling with acids.

My new product, which I have found by analytical research is the hexaoxyanthraquinone, equals $C_{14}H_2O_2(OH)_6$ crytallizes out of nitrobenzene or glacial acetic acid in dark needles of metallic luster. It is insoluble in water, soluble in sodium carbonate with blue-red color, soluble with violet color in soda-lye which solution when it is allowed to stand in the air turns blue, flakes gradually being separated. By ammonia it is dissolved with bluish-red color and the resulting liquid assumes gradually a violet color when it is exposed to the air. It dissolves in pure concentrated sulfuric acid with bluish-violet color; on the addition of water this solution becomes at first yellow, and then yellowish-brown flakes are separated therefrom. Its solutions in concentrated sulfuric acid show two characteristic absorption bands in the spectroscope. It dyes wool mordanted with alumina in violet shades, while those produced on wool mordanted with chromium salts are blue.

Having thus described my invention and in what manner it can be performed, that which I claim as new, and desire to secure by Letters Patent, is—

1. The process of producing a new anthraquinone derivative, hexaoxyanthraquinone, by oxidizing with a body containing $SO_3$ as described: alizarin, quinizarin, anthrachrysone or symmetrical dihydroxybenzoic acid, alizarin bordeaux, purpurin, purpuroxanthin or purpurin bordeaux, which latter product results when purpurin or purpuroxanthin is treated with fuming sulfuric acid, substantially as described.

2. The new hexaoxyanthraquinone, which crystallizes out of nitrobenzene or glacial acetic acid in dark needles of metallic luster; is insoluble in water, and dissolves in sodium carbonate with bluish-red color, and in soda-lye with violet color, which latter solution when exposed to the air at first turns blue and dark flakes gradually separate; and which hexaoxyanthraquinone dissolves in ammonia with bluish-red color, the resulting liquid slowly assuming a violet color when it is allowed to stand in the air; and which hexaoxyanthraquinone is dissolved by pure concentrated sulfuric acid with bluish-violet color; which solution shows two characteristic absorption bands in the spectroscope and turns yellow when mixed with water, from which yellowish brown flakes are finally separated; the said hexaoxyanthraquinone dyes wool mordanted with alumina, violet, and mordanted with chromium salts, blue shades.

In testimony whereof I have signed my name in the presence of two subscribing witnesses.

ROBERT E. SCHMIDT.

Witnesses:
RUDOLPH FRICKE,
WM. ESSENWEIN.